Jan. 24, 1967  J. JASNY  3,299,773
LENS FOR COLOR PHOTOGRAPHY
Filed March 11, 1964  4 Sheets-Sheet 1
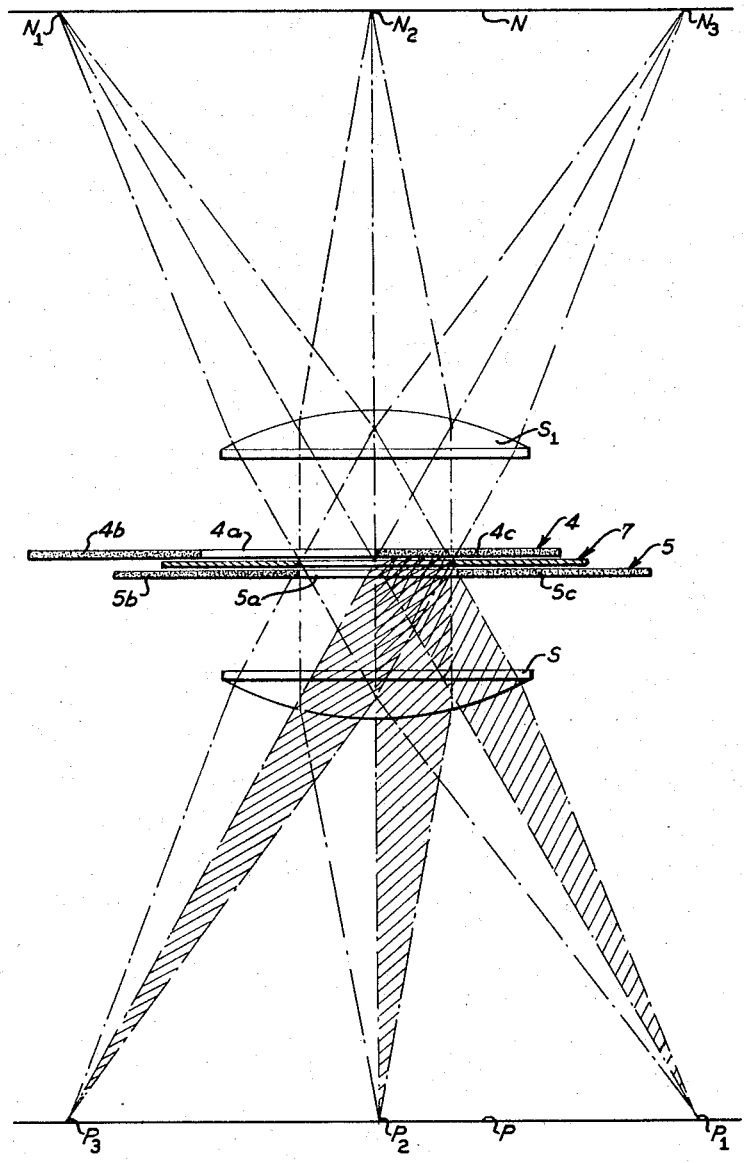
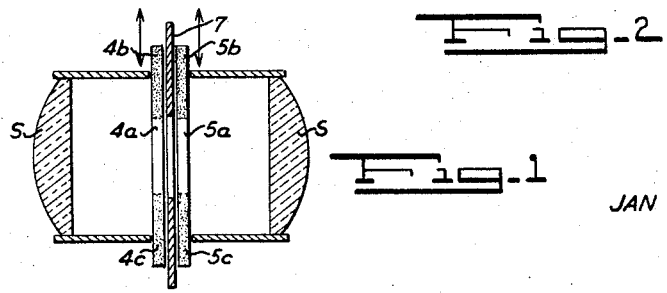
Fig-2
Fig-1
INVENTOR
JAN JASNY Jan. 24, 1967    J. JASNY    3,299,773
LENS FOR COLOR PHOTOGRAPHY
Filed March 11, 1964    4 Sheets-Sheet 2

INVENTOR
JAN JASNY

Jan. 24, 1967    J. JASNY    3,299,773
LENS FOR COLOR PHOTOGRAPHY
Filed March 11, 1964    4 Sheets-Sheet 3

INVENTOR
JAN JASNY

Jan. 24, 1967 J. JASNY 3,299,773
LENS FOR COLOR PHOTOGRAPHY
Filed March 11, 1964 4 Sheets-Sheet 4
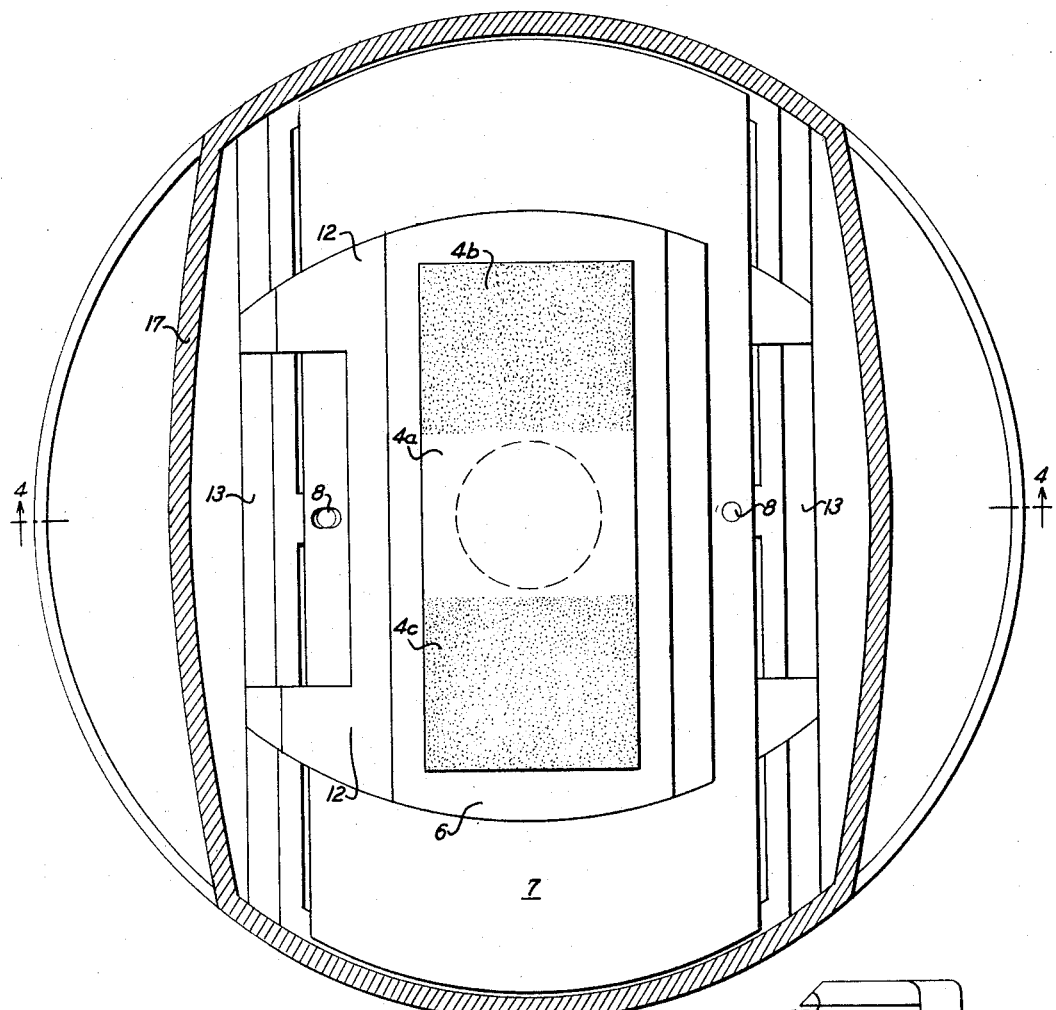
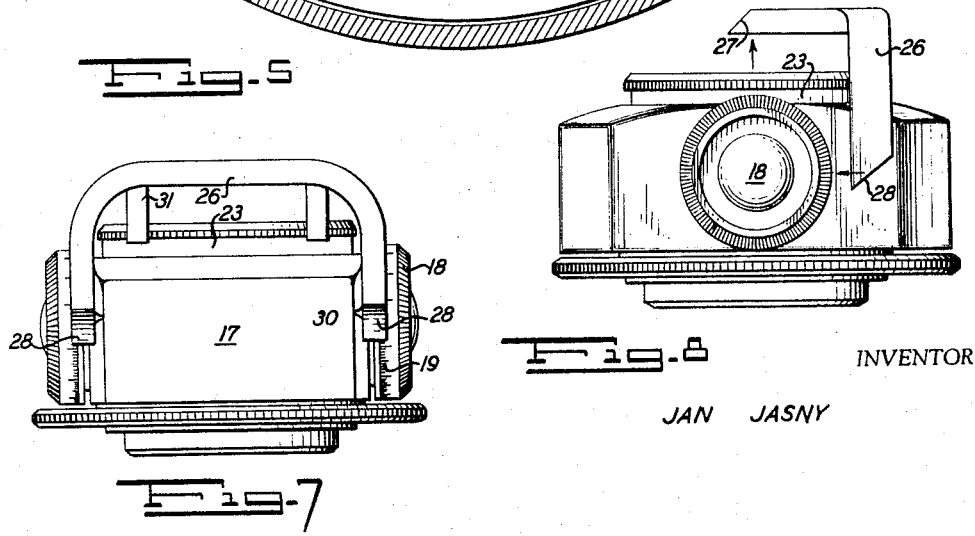
INVENTOR
JAN JASNY

United States Patent Office 3,299,773
Patented Jan. 24, 1967

3,299,773
LENS FOR COLOR PHOTOGRAPHY
Jan Jasny, Franciszka Hynka St. 7/56,
Warsaw, Poland
Filed Mar. 11, 1964, Ser. No. 351,129
Claims priority, application Poland, Mar. 14, 1963,
101,010
5 Claims. (Cl. 88—24)

The present invention is directed to a lens for color photography, and particularly to a lens provided with a filtering system consisting of two plano-parallel plates mounted slidably on both sides of the lens, each of these plates consisting of a central colorless part and of two side parts colored with one of the basic colors, which are characteristic for the subtractive method of mixing colors. A suitable adjustment of the colored parts of the said filtering plates in the diaphragm aperture, enables to obtain continuous change of the density of color of the light passing through the lens.

When making color prints or enlargements it is necessary to color in a suitable way the light incident on the positive material in order to obtain on this material the proper selection and density of colors. For the above purpose in enlargers used for color photography there is most frequently applied a set of three groups of filters corresponding to the three basic colors, while each of these groups consists of several or even between ten and twenty filters of various densities of color. As a result of the above, the whole set comprises several tens of single filters which are selected in a suitable way according to the required color of the light incident on the positive material in order to obtain the true reproduction of colors. However the use of the above set of replaceable filters does not allow to change the density of color in a continuous way, but enables only the stepped changing of the said density, which in many cases causes improper corrections, and in addition the use of the said set is connected with troublesome changing of filters and with high cost of the set.

In order to eliminate the above faults it is known to employ filtering systems in the enlarger, which enable continuous changing of the density of color of light passing through the lens while also facilitating handling of the enlarger. The hitherto known filtering systems of the above kind can be divided into two main categories: sets of filters placed in the lighting system of an enlarger (for example near the condenser, in the plane of the intermediate image of the source of light, and the like) and sets of filters located near the plane of the lens diaphragm. A basic fault of the filtering systems belonging to the first category (sets of filters placed in the lighting system) is the high complexity of their lighting system, which complexity is connected with necessity of use—for example— of additional arrangements for producing the intermediate image of the source of light, or else light mixing arrangements applied in order to obtain uniform coloring of light in the whole plane of the picture.

In order to eliminate partly the above mentioned faults there has been employed a filtering set placed near the lens and having the form of a disc divided into three segments each of which is colored with a different basic color, and also there has been employed a diaphragm slidable in two perpendicular directions which diaphragm enables to place the selected parts of the colored segments in the beam of rays which have passed through the lens. The fault of this design is the difficulty to provide a filter with a definite graduation in accordance with the generally used scales of the density of color, and the resulting difficulty of setting the filter for the required density of color. As a result of the above, this type of filtering set can be utilized only in cases where it is possible to set the required density of color in a standard way, for example in the case of color correction of moving picture prints. Moreover, in view of the fact that the filter diaphragm does not coincide with the diaphragm of the lens it is not possible to make full use of the beam of light which has passed through the lens, as otherwise there would be nonuniform coloring of the picture surface.

The above faults are eliminated by systems consisting of a set of filters located near the lens diaphragm. The hitherto known filtering system of this kind consists of three filters having the form of iris diaphragms, the transparent leaves of which are colored with basic colors and cover a suitable part of the constant aperture diaphragm, enabling the required change of the density of color, while the said filters are placed in such a way that one of them is located on the side of the constant aperture diaphragm, and the two remaining filters on the other side.

As a basic fault of the above design must be considered the lowering of the standard of the lens correction caused by providing a different optical path for the rays which do not pass through the filter diaphragm leaves, and those passing through the single and the overlapping leaves. Another reduction in the standard is caused by bending of the thin leaves when the diaphragm is being shut. A further fault of this design is the fact that there is not made full use of the filter density, whereas it is also not possible to obtain full closing of the lens constant aperture diaphragm by the colored filtering diaphragm. Yet another fault is the rapid wear of the leaves as a result of scratching of their surfaces during their sliding movement in relation to another. In view of the above faults the said design has proved to be not suitable for practical purposes, as a result of which there are not produced lenses with this kind of filtering systems.

All the above faults and difficulties are eliminated by the lens system for color photography according to the invention, which lens system is provided with a filtering system consisting of two transparent plano-parallel plates slidably fitted on the both sides of the natural (constant aperture) diaphragm of the lens, while each of the said plates consists of a central colorless part and the two colored side parts placed on the both sides of the said central part, which side parts are colored with one of the three basic colors characteristic for the subtractive method of color mixing, while one of the said basic colors appears on the both plates. By suitable shifting of the above mentioned plates in relation to the constant aperture diaphragm it is possible to change in the continuous manner the density of color of the light passing through the lens.

The present invention eliminates all the faults of the filters which have the form of an iris diaphragm, because the plano-parallel plate does not cause any change of the optical path of the rays of light when all parts of the plate are of the same index of refraction, and in addition the said plate enables complete covering of the diaphragm aperture, which means that it allows making usage of the full density of the filter. In the case of the said filtering system there is also eliminated any scratching or bending of the plates, as they are not in contact one with one another. Moreover, the lens system according to the invention eliminates also all the faults of a lens provided with a filtering set placed in the lighting system.

The lens system for color photography according to the present invention is provided with a rack type arrangement for shifting the filtering plates, which arrangement is coupled with scales of the density colors of the light which has passed through the lens system, while the said scales are located outside the lens system. The lens system is also provided with a guiding illuminator which uses the light passing through the lens for illuminating said scales.

Exploitation tests of the lens system according to the present invention have also shown that it is useful to apply two diaphragms, that is the diaphragm of constant aperture placed between the filtering plates as well as an iris diaphragm placed behind the filtering set, which arrangement enables to use the lens system according to the invention also for black and white photography.

The lens system according to the present invention eliminates also the faults of the hitherto known optical arrangements provided with sliding elements which require very close production tolerances of these elements in order to set them in proper position in relation to the optical axis of the lens. This is achieved by elastic mounting of the filtering set in the lens guide-ways and by connecting the set with the racks of the shifting arrangement in a way which enables mutual shifting of these elements along the optical axis of the lens. The invention enables also to increase the upper limiting value of color intensity for the particular basic colors by application of the additional attached filters fitted on the outer part of the lens.

The present invention is explained by way of example with reference to the accompanying drawing, wherein:

FIG. 1 is a schematic illustration of a lens system for color photography according to the invention;

FIG. 2 is a diagrammatic illustration showing the principle of operation of the lens system;

FIG. 5 is a cross-section through said lens system taken along line 5—5 in FIG. 4 and viewed in the direction of the filtering system of the lens system;

FIG. 7 is a side view of the lens system from the side at which readings are taken; and FIG. 8 is a side view of the lens system from the side at which the knobs are placed.

Figure 3:
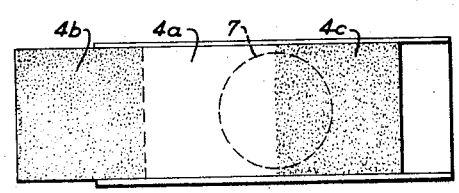
FIG. 3 is a plan view of one of the filtering plates.
Figure 4:
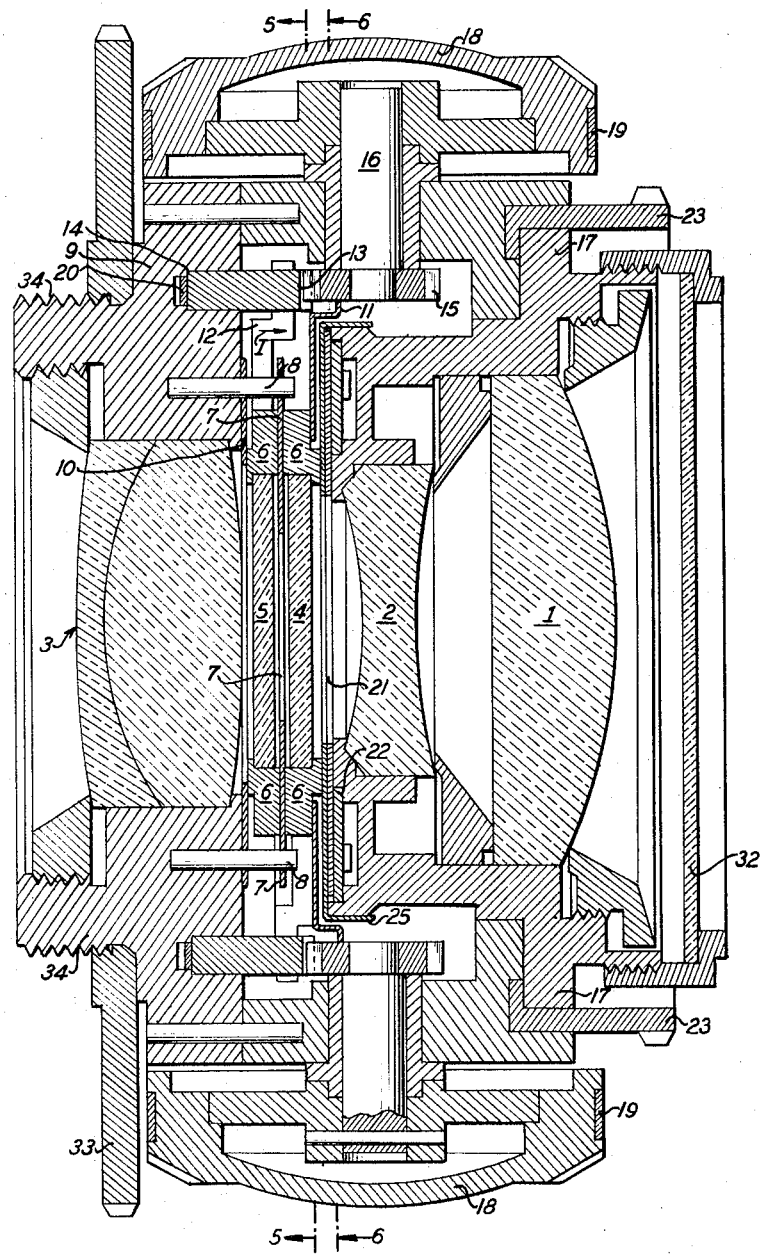
FIG. 4 is a cross-section through said lens system taken along line 4—4 in FIG. 5.

The principle of the lens system for color photography according to the invention is shown in FIGS. 1–3. The optical system of the lens system consists of a set of lenses s and of a natural diaphragm 7 of constant aperture, while the filtering system of the lens system consists of two plano-parallel plates 4 and 5 mounted slidably on both sides of the diaphragm 7. Each of the plates 4 and 5 consists of a colorless respective colorless central part 4a and 5a and of colored parts 4b, 4c and 5c located on the both sides of the said central part to the three basic colors A, B and C characteristic for the subtrative method of color mixing, while one of the said basic colors—for example A—appears in both plates 4 and 5.

FIG. 2 shows the manner in which a beam of light passing through the lens system may be colored. In the arrangement shown in FIG. 2 one of the filtering plates is placed in such a way that a half of the aperture of the diaphragm 7 is covered by the colored part 4c of the said plate, while the remaining half of the aperture is covered by the colorless part 4a, meanwhile the colorless part 5a of the second filtering plate 5 is aligned with the aperture of the diaphragm 7. The position of the filtering plate 4 in relation to the aperture of the diaphragm 7 is shown in plan view in FIG. 3.

The light coming from one of the points $N_1$ on the negative N forms a divergent beam and concentrates in the point $P_1$ of the positive P.

When passing through the filtering system, a part of the beam of light is colored by the colored part 4c of the filtering plate 4 (shaded part on the FIG. 2), and when it concentrates in the point $P_1$ of the positive the said beam causes the required intensity of coloring of a picture in this point. A change of the intensity of coloring can be obtained by shifting the plate 4, as a result of which the colored part 4c covers respectively a larger or smaller part of the aperture of the diaphragm 7.

The same mode of coloring is applied to beams of light coming from any other point $N_2$, $N_3$ of the negative N, causing the same coloring of respective points $P_2$ and $P_3$ of the positive P.

By covering the aperture of the diaphragm 7 with a colored part—for example 5b—of the second filtering plate 5, it is possible to obtain simultaneous coloring of the beam with the second basic color of an intensity dependent upon the percentage of the covered area of the aperture of the diaphragm 7. In this way it is possible to obtain—by suitable shifting of both filtering plates 4 and 5—a continuous adjustment of the intensity of color of the light passing through the lens, for the two selected basic colors—for examples $A+B$; $B+C$ or $A+C$—which covers all the possible combinations of the color correction of light used in enlargers. As a result of locating both the filtering plates very close to the lens diaphragm 7 there is obtained the uniform coloring of all points $P_1$, $P_2$, $P_3$ of surface of the positive P (FIG. 2).

The lens for color photography in accordance with the invention as shown in FIG. 5, consists of the following units: the optical system, the mounting, the filtering set, the shifting arrangement used for shifting of the filtering plates, the additional iris diaphragm, the guiding illuminator and the set of additional attached filters.

The optical system of the lens forms a triplet consisting of the two lower lenses 1 and 2, and of the adhesively secured upper lenses 3 separated from the lenses 1 and 2 by the filtering set and by the iris diaphragm.

The filtering set consists of the two plates 4 and 5. The plates 4 and 5 are fitted in the frames 6 separated one from another by the diaphragm 7 of constant aperture which diaphragm is mounted slidably on pins 8 fixed to the upper part 9 of the lens mounting. The guideway along which frames 6 of the filtering plates 4 and 5 slide, is formed by the washer 10 fitted on the pins 8, to which washer the said frames are pressed by means of plate springs 11.

The frames 6 are also provided with arms 12 engaging racks 13 of the shifting mechanism to enable relative shifting of the frames in the direction of the arrow I.

Figure 6:
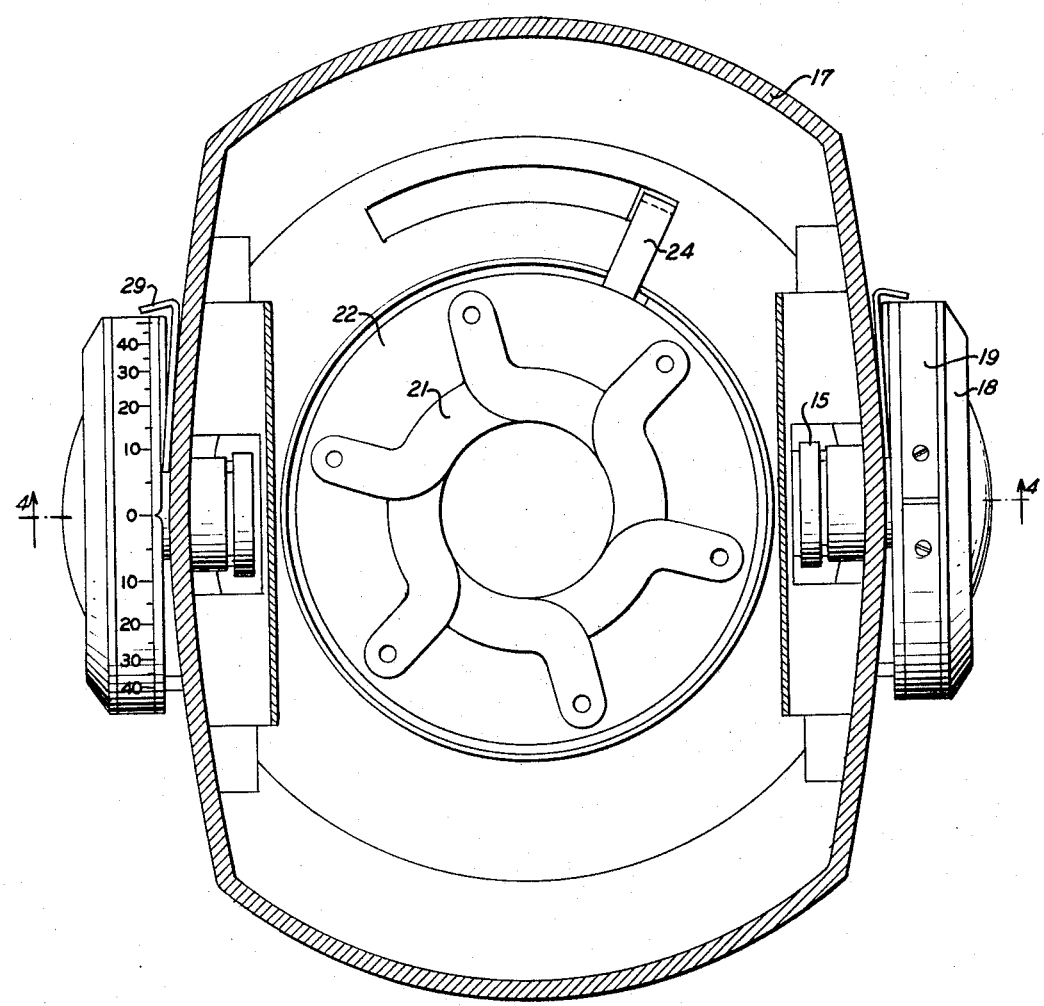
FIG. 6 shows the same cross section as shown that of FIG. 5 but viewed in the direction of the iris diaphragm.

The shifting mechanism used for independent shifting of both filtering plates 4 and 5 consists of the racks 13 fitted slidably in recesses 14 of the upper part 9 of the lens mounting and connected by means of the arms 12 with the frames 6, and it also consists of gears 15 used for shifting of the said racks. The gears 15 are keyed on shafts 16 mounted in bearings in the lower part 17 of the lens mounting and connected with knobs 18. On the periphery of knobs 18 are provided rings with scales 19 for the density of color of the light corresponding to the selected position of the filtering plates 4 or 5. Each of the two knobs 18 is used for shifting one of the plates 4 or 5. In order to eliminate the pitch play between the gears 15 and the racks 13, in the guideways 14 there are fitted plate springs 20 urging the racks 13 in engagement with the teeth of the gears 15. This arrangement is possible as a result of the sliding connection of the said racks 13 with the arms 12 of the frames 6. Moreover between the lower parts 1 and 2 of the optical system and its upper part 3 there is provided an additional iris diaphragm of known design, consisting of the leaves 21 and of the movable ring 22 connected by means of the protrusion 24 (FIG. 6) with the setting ring 23 fitted in rotary fashion on the lower part 17 of the lens mounting. In addition the iris diaphragm is provided with a metal shield 25 connected with the mounting 17. The lens is also provided with a light guiding illuminator 26, which has the form of a fork made of a material of high transparency, for example of methyl polymethacrylate, and is provided with an entry prismatic chamfer 27 as well as two exit chamfers 28 which illuminate indicators 29 of the scale 19 and the knobs 18. The illuminator is also provided with pins 30 used for articulated mounting of the said illuminator in the holes in the upper part 9 of the lens mounting and it is also provided with stops 31 used for setting the illuminator in operational position. Moreover, the lens is provided with a set of replaceable attached filters 32 fitted on the lower part 17 of the lens mounting.

The mounting 9 of the lens system is provided with a thread 34 used for fixing it to an enlarger, and with a knob 33 for setting the lens in a position which is convenient for taking readings from the scales 18.

Below is described the operation of use of the lens system according to the invention. The lens system is screwed into the threaded hole in an enlarger and is secured by means of the knob 33. After the sharpness of the projected negative has been set in known way, the required density of the particular filtering colors is set by means of the knobs 18 while the values of the said densities are read on the scales 19 which are illuminated by means of the illuminator 26. The illuminator is set then in its operational position at which its prismatic chamfer 27 is placed in the rays of light passing through the lens. The rays entering the illuminator are reflected internally from its walls and leave the illuminator through the prismatic chamfers 28 illuminating the indicators 29 and 19.

Turning of the knobs 18 causes the frames 6, in which are fitted the said filtering plates 4 and 5, to be shifted by means of gears 15 and racks 13 in such a way, that these parts of the filtering plates which are colored with the three basic colors A, B and C are displaced relative to the aperture of the diaphragm 7 of the lens according to the value set on the scales 19.

As a result of the elastic mounting of the filtering plates 4 and 5, the said plates are always set in a position perpendicular to the optical axis of the lens. By suitable shifting of both filtering plates 4 and 5 it is possible to obtain continuous adjusting of the intensity of the light passing through the lens for two basic colors selected in any required way, for example $A+B$; $B+C$ or $A+C$, from the three basic colors A, B, C, which covers all possible combinations of color correction of light used in enlargers. After the color correction has been adjusted, the illuminator is moved out of the path of the light beam by turning it around the pins 30, and then the negative is exposed.

In order to increase the upper limiting value of the color intensity for one of the basic colors A, B or C there is used a suitable attached filter 32 the density of which is equal to the density of the filtering plates 4 or 5.

The lens system according to the invention can be also used for black-and-white photography with the possibility of setting various relative apertures. In order to do so, the filtering plates 4 and 5 are shifted by means of the knobs 18 into the zero position of the scales 19, at which position the colorless parts of the said filtering plates are aligned with the aperture of the diaphragm 7 of the lens system, after which the required relative aperture of the lens system is set by means of the setting ring 23 and the iris diaphragm.

The lens for color photography according to the invention is designed especially for enlargers, but as a result of its design it can be used also for color as well as for black-and-white photography.

I claim:

1. A lens system for use in color photography comprising at least two spaced lens elements, a diaphragm plate having an opening and a filtering system adjacent said diaphragm plate, said diaphragm and filtering system being disposed between said spaced lens elements, said filtering system being constituted by two plates slidably mounted on opposite sides of the diaphragm plate in immediate proximate relation therewith, each of said plates including a colorless central part and two colored parts located on both sides of said central parts, said colors being the three basic colors characteristic for the subtractive method of mixing colors, one of said basic colors being in both said filtering plates, a rack mechanism for displacement of each of the filtering plates, a gear engaging each rack mechanism to drive the same and engaging means coupled to each of said gears to operate the same, each said engaging means being provided with a scale corresponding to the density of color of the light passing through the lens, illumination means movable between operative and inoperative positions, said illumination means in the operative position being in the path of the light rays passing through the lens for diverting light to illuminate said scales, whereas in said inoperative position, the illumination means is out of the path of the light rays.

2. A lens system as claimed in claim 1 comprising an iris diaphragm disposed between said lens elements and outside both plates of the filtering system.

3. A lens system as claimed in claim 1 comprising means supporting the filtering plates and the diaphragm plate for common sliding movement relative to the optical axis of the lens and spring means acting axially on the plates and diaphragm plate as a unit.

4. A lens system as claimed in claim 3 wherein said means supporting the filtering plates comprises frames for said plates supporting the same and said diaphragm plate for common sliding movement in a direction perpendicular to the relative sliding movement of the plates with respect to the diaphragm plate.

5. A lens system as claimed in claim 1 comprising a set of additional attached filters supported outside the lens elements corresponding to the basic colors having a density equal to the density of the respective parts of the filtering plates.

References Cited by the Examiner

UNITED STATES PATENTS

| 2,300,970 | 11/1942 | Riess | 88—24 |
| 2,354,108 | 7/1944 | Flemming | 88—24 |
| 2,504,254 | 4/1950 | Grave | 240—21 |
| 2,672,799 | 3/1954 | Terwilliger | 95—18 X |
| 3,161,108 | 12/1964 | Modney | 88—24 |

JOHN M. HORAN, *Primary Examiner.*